UNITED STATES PATENT OFFICE.

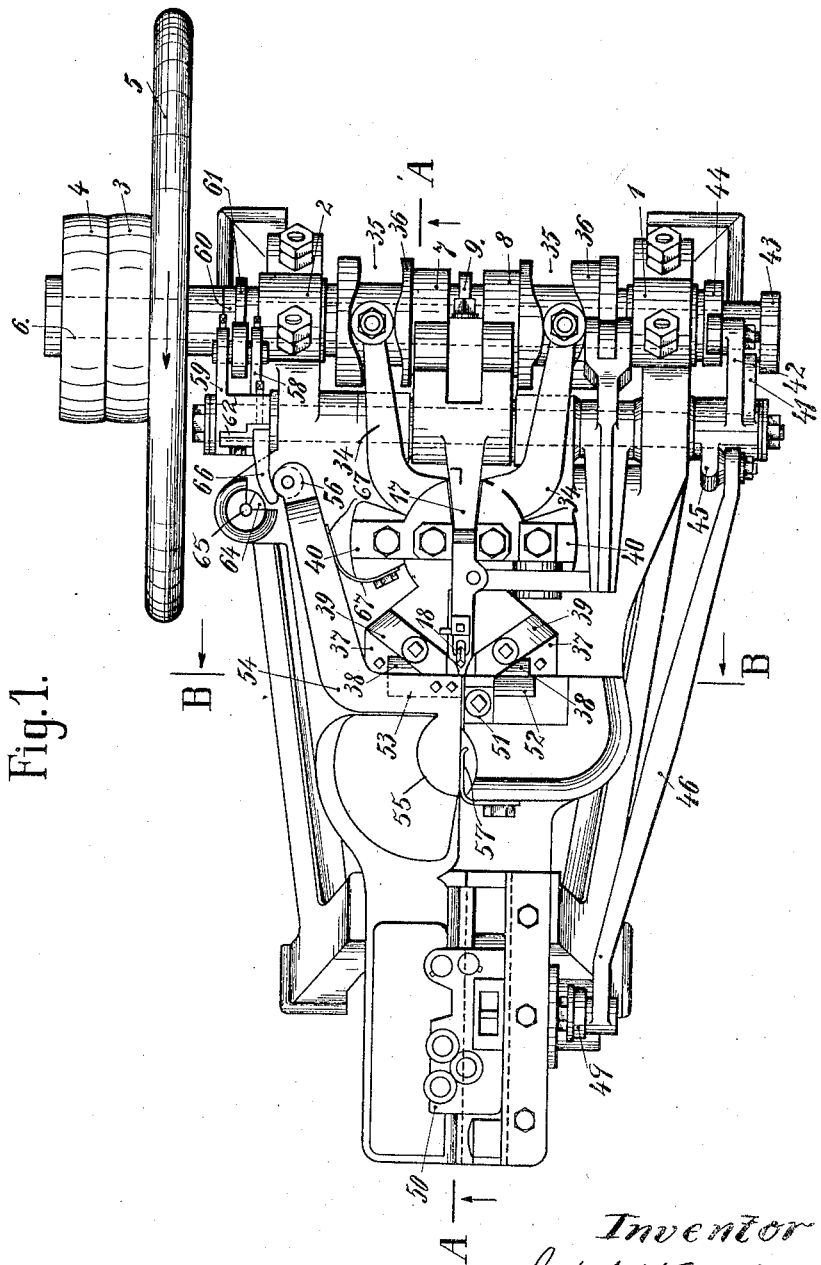

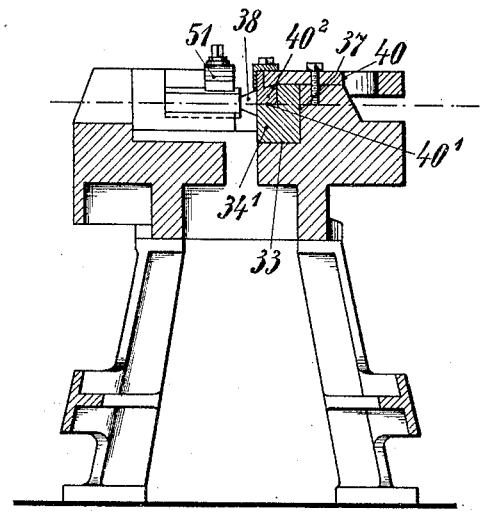
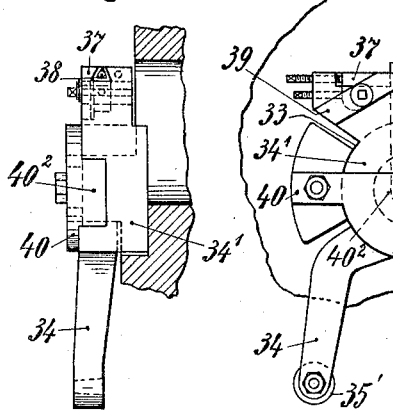
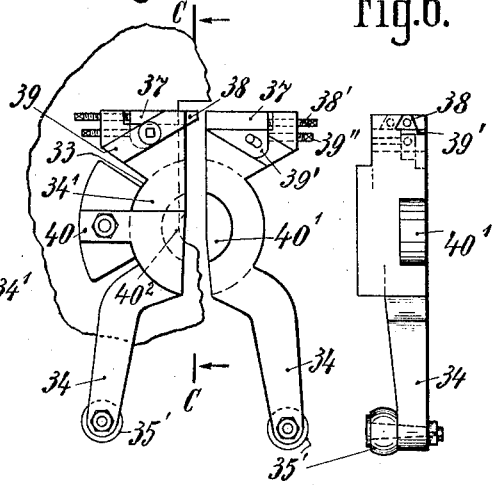

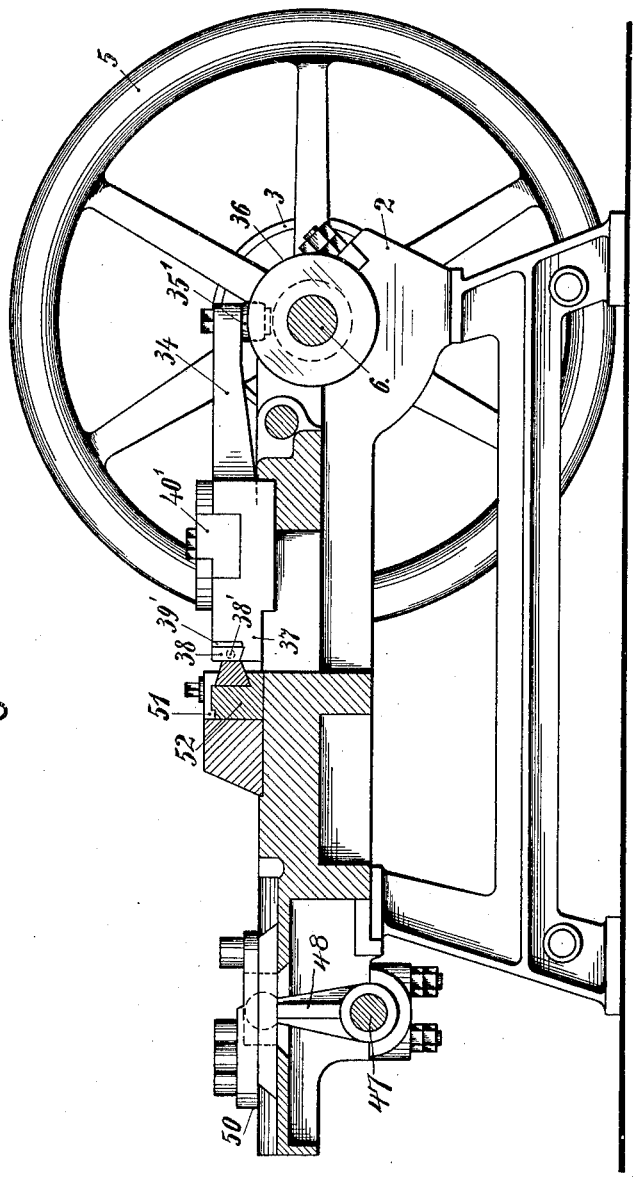

JAKOB WIKSCHTRÖM, OF DUSSELDORF, GERMANY.

MACHINE FOR MAKING NAILS OR PINS FROM WIRE.

1,321,778.  Specification of Letters Patent.  Patented Nov. 11, 1919.

Original application filed January 26, 1914, Serial No. 814,487. Divided and this application filed December 28, 1916. Serial No. 139,402.

*To all whom it may concern:*

Be it known that I, JAKOB WIKSCHTRÖM, a citizen of Germany, and residing at Dusseldorf, in the German Empire, have invented certain new and useful Improvements in Machines for Making Nails or Pins from Wire, of which the following is a specification.

This invention relates to improvements in machines for making nails or pins from wire. The object of my present invention is to provide in such machines an improved cutting device for pointing the wire nails or pins after the same have been headed, this application being a division of an application filed by me on January 26th, 1914, under Serial Number 814487, (Patent No. 1,246,513, dated November 13, 1917).

My invention consists in certain novel features which will be described hereinafter with reference to the accompanying drawings which form a part of this specification and in which like characters of reference denote the same or like parts, the drawings illustrating an embodiment of my invention by way of example.

Figure 1 is a plan view of a machine in which my present invention is applied, while Fig. 2 represents a section on the line B—B of Fig. 1, and Fig. 3 a section on the line A—A of Fig. 1, Figs. 4, 5 and 6 showing parts of the novel nail pointing device in various detail views, Fig. 4 being a plan, Fig. 5 a section on the line C—C of Fig. 4, and Fig. 6 a side elevation.

My present invention is illustrated to be applied in a suitable machine in conjunction with devices for feeding, heading, and clamping the wire to be pointed, the devices for clamping and heading the wire being more specifically described and claimed in my said application, Serial Number 814487. However, before I proceed to set forth the present invention I will give a brief description of the machine in which the same may be preferably applied.

Referring to the drawings, the frame of the machine is shown to be provided with bearings 1 and 2 for a main operating shaft 6 to which movement is imparted from a suitable source of power by means of the pulley 3, a loose pulley 4 and a fixed fly wheel 5 being mounted on the shaft 6 adjacent to the said driving pulley 3, for well known purposes. Intermediate the bearings 1 and 2 are disposed a pair of cam disks 7 and 8 and an intermediate cam disk 9, which three cam disks control the movement of a heading member 17 carrying a heading punch 18 at the end away from the controlling cams 7, 8, 9.

In conjunction with the above heading device a wire feeding mechanism 50 is provided and shown to be supported on the machine frame. The said feeding device may be of any approved construction and is preferably actuated in timed relation to the said heading device of the machine from the main operating shaft 6 by means of suitable cams and levers such, for instance, as a bell-crank lever secured to the shaft and consisting of three arms 41, 42 and 45. The arms 41 and 42 are provided with rollers engaged by cam disks 43 and 44 by means of which positive rocking movement is imparted to the bell crank lever. The third arm 45 is connected by a link 46 to a crank arm 49 fixed on a shaft 47, so that the rocking movement of the bell crank lever is transmitted to said shaft. A second crank arm 48 (Fig. 3) is fixed to the shaft 47 for transmitting a reciprocating movement to the wire feeding device 50.

Between the heading punch 18 and the feeding device 50, a clamping jaw 52 is secured to the frame by means of a plate 51. This clamping jaw coöperates with a movable clamping jaw 53 fixed in a rocking lever 54 which is fulcrumed in a circular cut out bearing portion 55 of the machine frame and said lever is held in the bearing by a spring 57. A spring 67 acting on the opposite or free end of said lever 54 tends to rock the same outward.

When the wire is advanced by means of the feeding mechanism 50, the movable clamping jaw 53 is forced into engagement with the stationary jaw 52 so as to clamp the wire. This is effected by means of a bell crank lever having three arms 58, 59 and 62, mounted adjacent the fly wheel 5. The arms 58 and 59 engage cam disks 60 and 61 secured to the main shaft 6 and impart positive rocking motion to the bell crank lever. On the arm 62 is mounted a dog 66 which projects between and engages both a roll 56, on the free end of lever 54, and a pivoted sector 64. The cam disk 61 rocks the lever 59 upward and rocks the arm 62 to the left, whereby the dog 66 is forced forward into the position shown in Fig. 1.

The spring 67 acting through the lever 54 forces the roller 56 against the dog 66 and sector 64 and the rocking of the latter on its pivot 65 forces the lever 54 inward and the clamping jaw 53 into engagement with the stationary jaw 52.

The improved cutting device according to my present invention comprises a pair of rocking levers 34, 37, which are mounted so as to turn around a common center disposed in the axis of the wire to be subjected to the various nail producing operations of the machine and fed for that purpose by the feeding device 50. Each of the said rocking levers has two arms 34 and 37, the one extending toward the main operating shaft 6 and the other terminating in front of the described clamping jaws. The arms 34 are equipped with rolls 35' engaging cam grooves 35 of drums 36 which are mounted on the shaft 6, their object being to impart operating movements to the said rocking levers. The said rocking levers are mounted in a circular cut-out portion 33 of the machine frame and for that purpose provided with semi-circular enlargements 34', which form hubs fitting the said dished frame portion 33 and bearing at opposite sides on the walls of the said portion 33. At their upper sides the said hubs are provided with semi-circular indentations 40' into which are fitted semi-cylindrical projections $40^2$ of a pair of clamping plates 40 secured to the machine frame by means of suitable screws as indicated in the drawings. These plates 40 overlie the described bearings for the rocking levers and hold the latter in proper position while allowing them to freely rock. Preferably, the median hub portions 34' are made integral with their respective rocking levers each of which comprises two arms 34 and 37. The arms 37 terminating in front of the said clamping jaws for holding the wire in position for the pointing operation, carry at their extremes suitably shaped cutters 38 in dovetailed ways which are closed at the upper sides by clamping plates 39. By means of adjusting screws 38', 39'', and wedges 39' and the said clamps 39 the cutters 38 are adjustably secured in position, although any other approved means may be employed for this purpose.

In the course of operation of the machine, the said rocking levers are actuated by means of the cams 35, 35 and move the pair of arms 34, 34 away from each other causing the cutters 38, 38, supported on the arms 37, 37, to move toward each other to coöperate in performing the pointing action upon the wire held between the clamping jaws 52, 53. While the main operating shaft 6 continues to revolve, the said cutters separate under the control of their associated cams 35.

By mounting the levers 34—37 so that they oscillate about a center located in the longitudinal axis of the wire to be operated upon, both the cutters 38 travel in the same arc, instead of intersecting arcs. By moving the cutters in the same arc a drawing action is prevented on the wire, which is held between the jaws 52, 53 during the cutting operation. This leaves the unpointed end of the wire in better shape for heading than where a drawing action is imparted, which takes place when the cutters oscillate about different axis and consequently move in intersecting arcs. Since the fulcrums of the rocking members present comparatively large areas and their pressure is directly taken up by the stationary machine frame the unavoidable wear and tear of these parts is reduced to quite a minimum.

What I claim as my invention and desire to secure by Letters Patent of the United States, is:

1. In a wire nail machine, the combination with a wire feeding mechanism and a wire clamping mechanism, of a wire cutter comprising a lever having a convex bearing surface mounted to oscillate in a segmental recess concentric thereto and concentric to an axis passing through the wire operated upon.

2. In a wire nail machine, the combination with a wire feeding mechanism and a wire clamping mechanism, of a wire cutter comprising a lever having a convex bearing surface mounted to oscillate in a segmental recess concentric thereto and concentric to an axis passing through the wire operated upon, and means to hold the bearing surface in said recess.

3. In a wire nail machine, the combination with a wire feeding mechanism and a wire clamping mechanism, of a wire cutter comprising a two armed lever having a convex bearing surface intermediate its ends, a segmental recess on the machine frame having a bearing surface concentric to the aforesaid bearing surface and to an axis passing through the wire operated upon, and a segmental retaining member fixed on the frame and engaging the lever to maintain said bearing surface in operative relation to the recess.

4. In a wire nail machine, the combination with a wire feeding mechanism and a wire clamping mechanism, of a wire cutting mechanism comprising a pair of levers spaced apart at their pivotal axis and having bearing surfaces concentric to the latter, and bearing surfaces for the levers arranged on the sides of the latter opposite to the sides on which the axis is located.

5. A wire nail machine comprising a frame, oppositely arranged segmental recesses formed therein having a common axis, wire cutting levers arranged to oscillate in said recesses and means to maintain the levers in the latter, whereby a passage is formed between the opposed sides of the levers.

6. A wire nail machine, comprising a frame, oppositely arranged segmental recesses formed therein having a common axis, wire cutting levers arranged to oscillate in said recesses, and segmental retaining members entering corresponding recesses formed in the levers.

7. In a wire nail machine, the combination with a wire feeding mechanism, a wire clamping mechanism, of segmental bearing surfaces arranged on opposite sides of and concentric to an axis passing through the wire operated upon, wire cutting levers arranged between and fulcrumed on said bearing surfaces, and retaining plates having segmental projections arranged in recesses formed in the levers concentric to said bearing surfaces.

In testimony whereof I have hereunto affixed my signature.

JAKOB WIKSCHTRÖM. [L. S.]

Witnesses:
HELEN NUFER,
C. C. BINKEE.

Copies of this patent may be obtained for five cents each, by addressing the "Commissioner of Patents, Washington, D. C."